United States Patent
Chui (10) Patent No.: US 11,212,510 B1
(45) Date of Patent: **\*Dec. 28, 2021**

(54) MULTI-CAMERA 3D CONTENT CREATION

(71) Applicant: Outward, Inc., San Jose, CA (US)

(72) Inventor: Clarence Chui, Los Altos Hills, CA (US)

(73) Assignee: Outward, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,735

(22) Filed: Aug. 18, 2020

Related U.S. Application Data (63) Continuation of application No. 14/472,338, filed on Aug. 28, 2014, now Pat. No. 10,791,319.

(60) Provisional application No. 61/871,258, filed on Aug. 28, 2013.

(51) Int. Cl.
*H04N 13/239* (2018.01)

(52) U.S. Cl.
CPC .................. *H04N 13/239* (2018.05)

(58) Field of Classification Search
CPC .. H04N 13/239; H04N 13/243; H04N 13/204; H04N 7/181
See application file for complete search history.

(56) References Cited

U.S. PATENT DOCUMENTS

| | | | |
|---|---|---|---|
| 8,897,543 B1 | 11/2014 | Lin | |
| 2003/0095711 A1* | 5/2003 | McGuinness | G06T 7/33 382/209 |
| 2004/0167667 A1 | 8/2004 | Goncalves | |
| 2007/0110338 A1 | 5/2007 | Snavely | |
| 2008/0262718 A1* | 10/2008 | Farwell | G05D 1/0244 701/445 |
| 2009/0086014 A1 | 4/2009 | Lea | |
| 2010/0045701 A1* | 2/2010 | Scott | H04N 7/183 345/633 |
| 2011/0074926 A1* | 3/2011 | Khan | H04N 13/246 348/46 |
| 2011/0298897 A1 | 12/2011 | Sareen | |
| 2012/0148145 A1 | 6/2012 | Liu | |

(Continued)

OTHER PUBLICATIONS

Hartley, R.I., and Zisserman, A. (2004) "Multiple View Geometry", Cambridge University Press, pp. 469-473, Cambridge, UK.

(Continued)

*Primary Examiner* — Mohammed S Rahaman
(74) *Attorney, Agent, or Firm* — Van Pelt, Yi & James LLP (57) ABSTRACT

Techniques for generating three-dimensional content from the recordings of multiple independently operated cameras that are not constrained to fixed positions and orientations are disclosed. In some embodiments, data from a plurality of cameras configured to capture a scene is received; a relative pose of each camera with respect to the scene is determined based at least in part on a first estimate and a second estimate, wherein the first estimate is based on image data and the second estimate is based on sensor data; relative poses of cameras with respect to one or more other cameras are determined based on determined relative poses of individual cameras with respect to the scene; and a three-dimensional reconstruction of at least a portion of the scene is generated based on the received data and determined relative poses.

48 Claims, 4 Drawing Sheets

(56) References Cited

U.S. PATENT DOCUMENTS

| | | |
|---|---|---|
| 2012/0327194 A1 | 12/2012 | Shiratori |
| 2013/0229529 A1 | 9/2013 | Lablans |
| 2014/0286566 A1 | 9/2014 | Rhoads |
| 2014/0294361 A1* | 10/2014 | Acharya ................ G06T 17/00 386/241 |

OTHER PUBLICATIONS

Lowe, D.G. (2004) "Distinctive Image Features from Scale-Invariant Keypoints", International Journal of Computer Vision, 60(2): 90-110.

Snavely, N., Seitz, S. M., and Szeliski, R. (2006) "Photo Tourism: Exploring Photo Collections in 3D", ACM Transactions on Graphics (Proc. SIGGRAPH 2006), 25(3): 835-846.

Szeliski (2011) "Computer Vision Algorithms and Applications", pub Springer-Verlag London, p. 307.

* cited by examiner

MULTI-CAMERA 3D CONTENT CREATION

CROSS REFERENCE TO OTHER APPLICATIONS

This application is a continuation of U.S. patent application Ser. No. 14/472,338, now U.S. Pat. No. 10,791,319, entitled MULTI-CAMERA 3D CONTENT CREATION filed Aug. 28, 2014, which claims priority to U.S. Provisional Patent Application No. 61/871,258 entitled MULTI-CAMERA 3D CONTENT CREATION filed Aug. 28, 2013, both of which are incorporated herein by reference for all purposes.

BACKGROUND OF THE INVENTION

Various techniques exist for three-dimensional content creation. Traditional approaches for generating three-dimensional content may employ a single or a plurality of cameras as further described below.

A single camera with known pose information moving around a static object or scene may be employed to create a three-dimensional perspective based on correspondence of images from the camera at different angles or times. Such a single camera approach is limited to static or still objects and scenes.

Two or more cameras may be employed to generate static or moving three-dimensional content. In such cases, relative poses of the cameras are established by fixed and predetermined geometric constraints. For example, the cameras may be physically mounted at prescribed positions and orientations to record a scene. Correspondence between two or more perspectives of the scene is used to generate a three-dimensional representation of the scene. Such a multi-camera approach may be employed to generate three-dimensional content that includes motion.

As described, traditional techniques for three-dimensional content generation rely on apriori knowledge of camera pose and/or relative pose.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for synchronizing content from a plurality of independently operated cameras that have captured possibly different perspectives of the same scene to generate at least a partial three-dimensional (3D) reconstruction of the recorded scene are disclosed. As further described herein, no foreknowledge exists of the relative pose (i.e., position and orientation) of each camera with respect to the scene as well as the relative poses between cameras. Rather, relative poses are determined using the disclosed techniques. By using multiple available camera perspectives of a scene and their correspondence based on independently estimated pose data, portions of the recorded scene where more than one view is available may be reconstructed in static and/or moving 3D as applicable.

Figure 1:
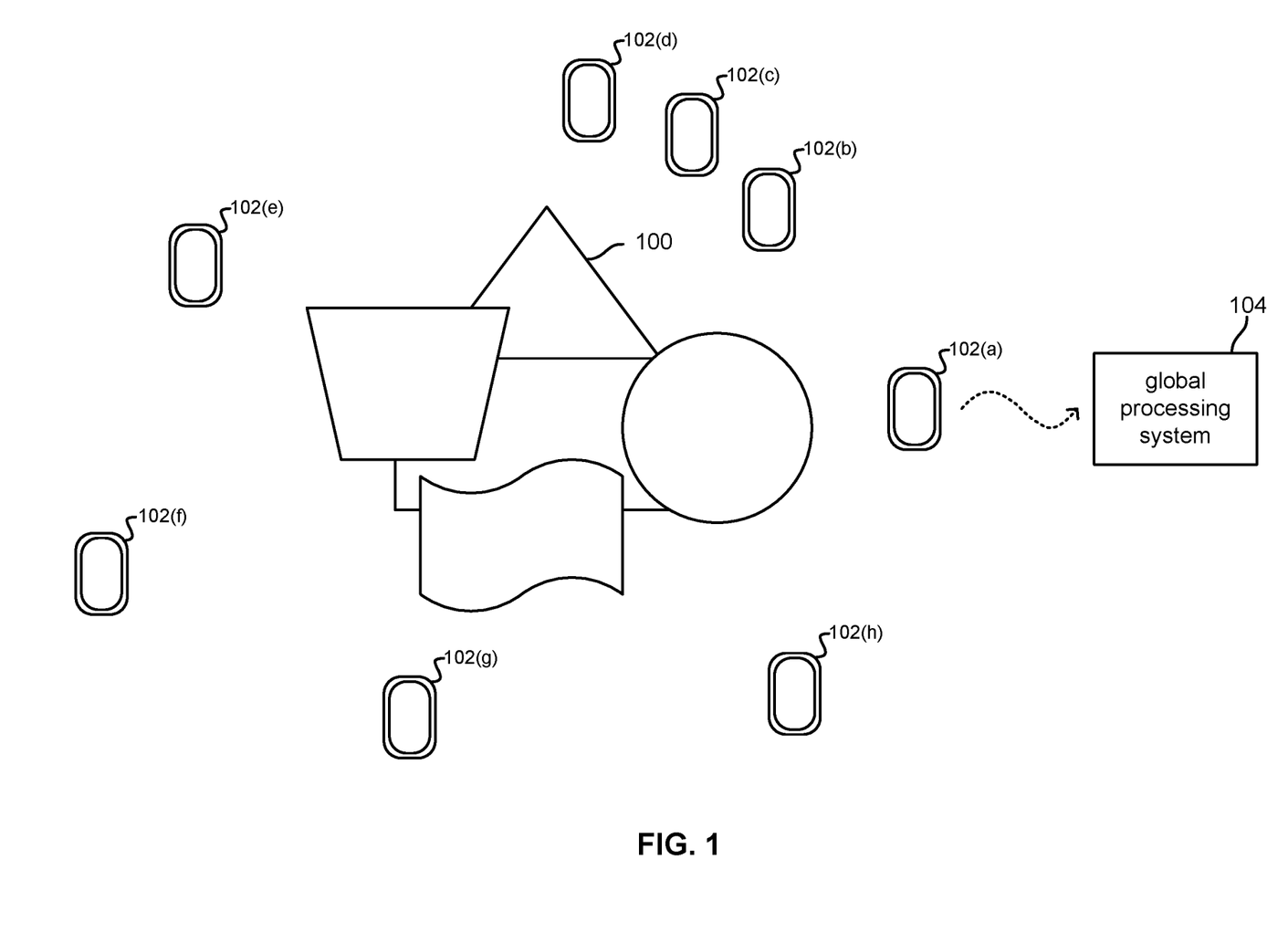
FIG. 1 is a diagram illustrating an embodiment of a manner in which content captured by a plurality of cameras may be reconstructed in three-dimensions.

FIG. 1 is a diagram illustrating an embodiment of a manner in which content captured by a plurality of cameras may be reconstructed in three-dimensions. In the given example, a scene 100 comprising a plurality of objects is simultaneously filmed from various angles and perspectives by a plurality of mobile phone cameras 102(a)-(h). The operators of the mobile phones are not constrained to fixed positions and orientations but instead are free to move while recording scene 100. Thus, the relative pose of each camera 102 with respect to scene 100 as well as the relative poses between cameras 102 are not fixed or known apriori and furthermore are time variant.

Recordings from the various participating cameras 102 are communicated to a global processing system 104 configured to synchronize the recordings to generate a three-dimensional reconstruction of the recorded scene 100. Synchronization may be performed with respect to a plurality of time slices of the recordings to determine three-dimensional motion of the scene 100. As further described below, correspondence of different camera perspectives is based on estimating relative camera pose with respect to the scene 100 for each camera 102 as well as relative poses between cameras 102 using feature tracking with respect to the recordings of cameras 102 and/or associated inertial sensor data.

In the example of FIG. 1, various data collection, processing, and/or communication functionalities associated with three-dimensional scene reconstruction are facilitated via a mobile phone application comprising a client-side application at the mobile phone associated with each camera 102 and a server-side application at global processing system 104. In other embodiments, a plurality of cameras and a global processor may be arranged in any other appropriate configuration. Moreover, the disclosed techniques may be generally employed with respect to image and/or video data for static and/or motion-based three-dimensional reconstruction.

Figure 2:
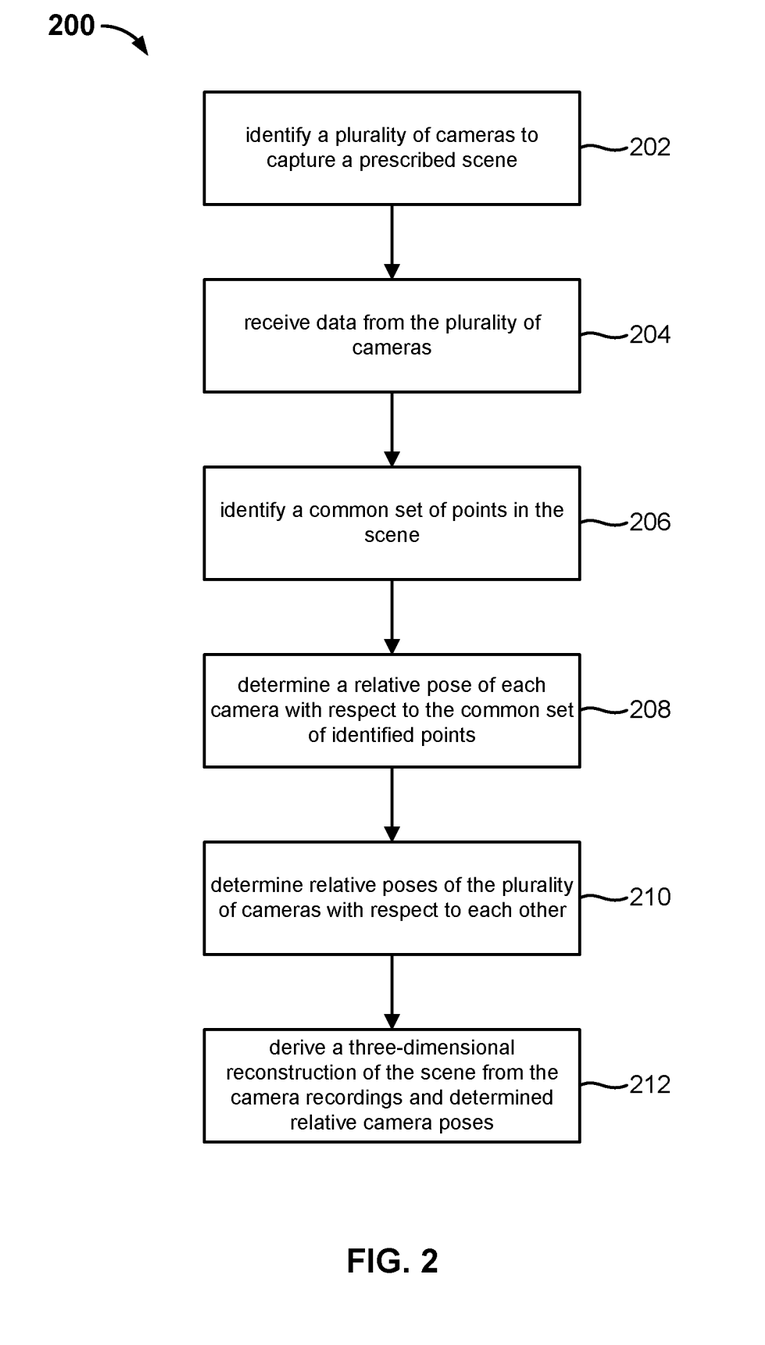
FIG. 2 is a flow chart illustrating an embodiment of a process for generating a three-dimensional reconstruction of a scene.

FIG. 2 is a flow chart illustrating an embodiment of a process for generating a three-dimensional reconstruction of a scene. For example, process 200 may be employed by global processing system 104 of FIG. 1. Process 200 starts at step 202 at which a plurality of cameras configured to (simultaneously) capture a prescribed scene is identified. In some cases, it may be known that the plurality of cameras is configured to capture the prescribed scene, for example, if the cameras (and/or associated mobile phones and/or applications) have specifically been instructed (e.g., by a server-side application) to capture the prescribed scene and/or have otherwise indicated participation in capturing the scene. In some cases, it may be manually and/or automatically determined that the plurality of cameras is capturing the same scene, e.g., based on identifying that the same features and/or fiducials comprising the scene have been captured by the cameras. In various embodiments, the scene may comprise one or more static and/or moving objects.

At step 204, data from the plurality of cameras is received. For example, the data received from each camera may comprise a video recording and/or a sequence of images of the scene. A received image, for instance, may comprise a frame of a video recording at a particular moment in time. Furthermore, the data received at step 204 from each camera may include sensor data, for example, from an associated mobile phone. Such sensor data may include Global Positioning System (GPS) data as well as other inertial and/or orientation data obtained from an associated compass, accelerometer, etc. In some cases, the sensor data comprises three translational coordinates and three rotational angles representing a combined six degrees of freedom. In some embodiments, the data received at step 204 is time stamped so that data from the plurality of cameras for a given time slice may be processed together.

At step 206, a common set of points in the scene that are likely to have been captured by most, if not all, of the plurality of cameras is identified. For example, video frames associated with a prescribed time slice captured by the plurality of cameras may be manually and/or automatically searched at step 206 to identify commonly captured areas of the scene and the common set of points. In some embodiments, the common set of points comprises distinct features and/or fiducials of the scene or parts thereof that may, for example, be used for registration. In some embodiments, the common set of points comprises at least four non-coplanar points.

At step 208, a relative pose of each camera with respect to the common set of identified points in the scene is determined. In various embodiments, the relative pose of each camera may be determined with respect to any combination of one or more points in the common set of points. The image and/or video data from each camera may be processed using feature extraction, tracking, and/or correspondence algorithms to generate an estimate of camera pose with respect to image content, i.e., the common set of identified points. Moreover, sensor data associated with the camera may be employed to verify and/or provide a parallel estimate of individual camera pose as well as fill in gaps for pose estimate when pose cannot be obtained visually, e.g., during instances of time when the camera field of view does not include the scene under consideration and/or the common set of identified points. Furthermore, motion estimates from sensor data may be employed to calculate the approximate view from each camera as a function of time. At step 210, relative poses of the plurality of cameras with respect to each other are determined based on the relative poses of each camera with respect to the common set of identified points.

At step 212, images or frames captured by the cameras as well as the determined relative poses of the cameras are processed to derive a three-dimensional reconstruction of the scene in the common field of view of the cameras. For example, step 212 may comprise calculating correspondence between images comprising a frame (i.e., images associated with a particular time slice) that have been captured by the plurality of cameras. Once correspondence is calculated, the images corresponding to a frame or time slice can be rectified, and depth information for tracked features can be computed. A sparse point cloud can then be used to guide calculation of a dense surface in three-dimensional space.

Figure 3:
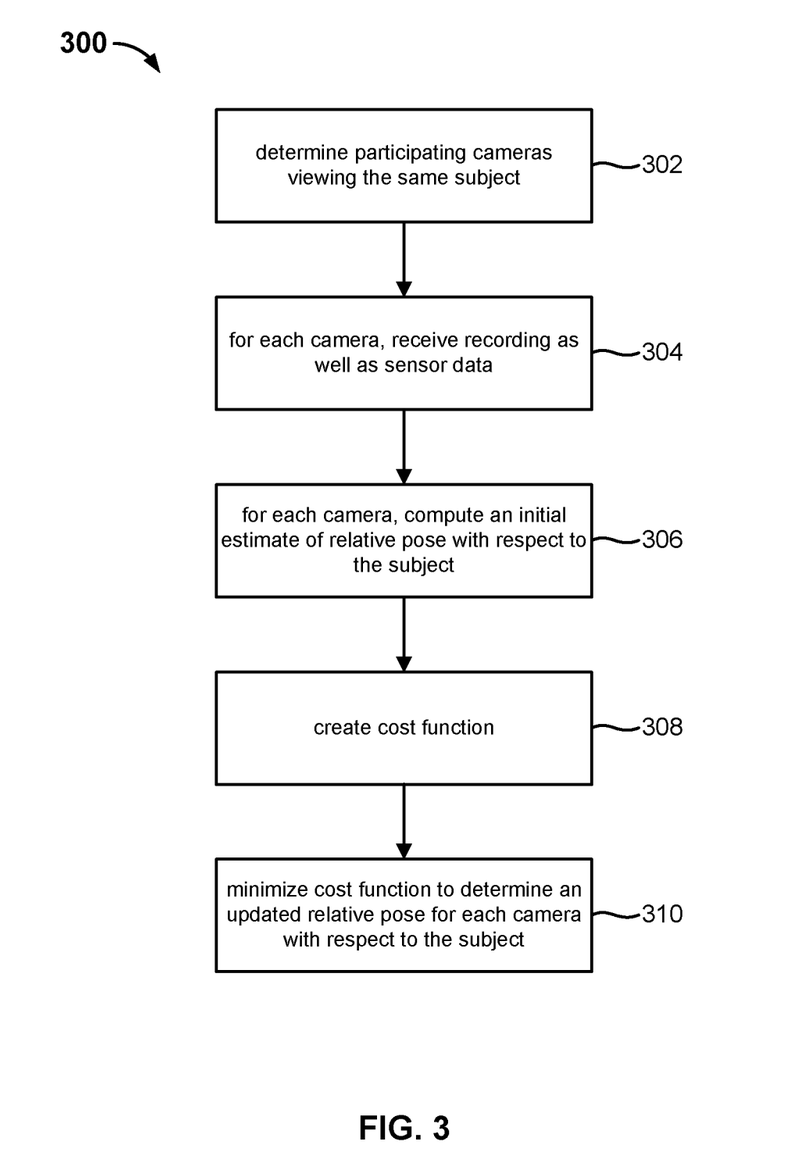
FIG. 3 is a flow chart illustrating an embodiment of a process for facilitating multi-camera coarse alignment.
Figure 4:
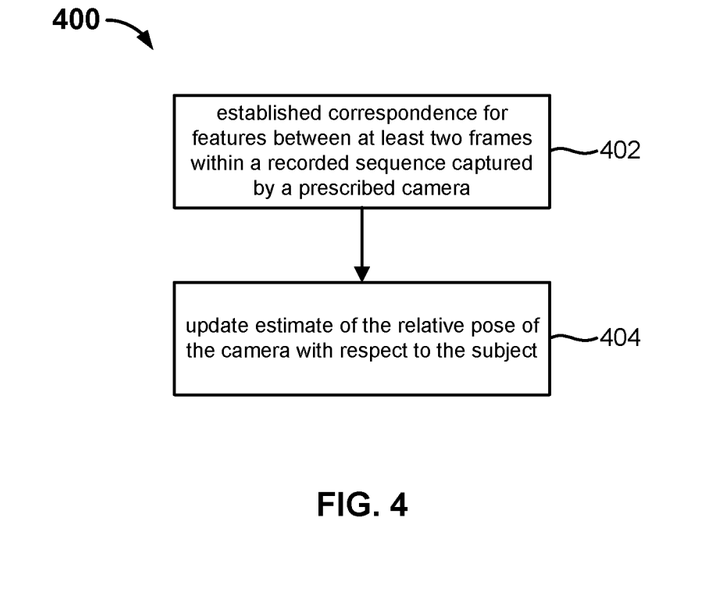
FIG. 4 is a flow chart illustrating an embodiment of a process for facilitating single camera fine alignment.
Figure 5:
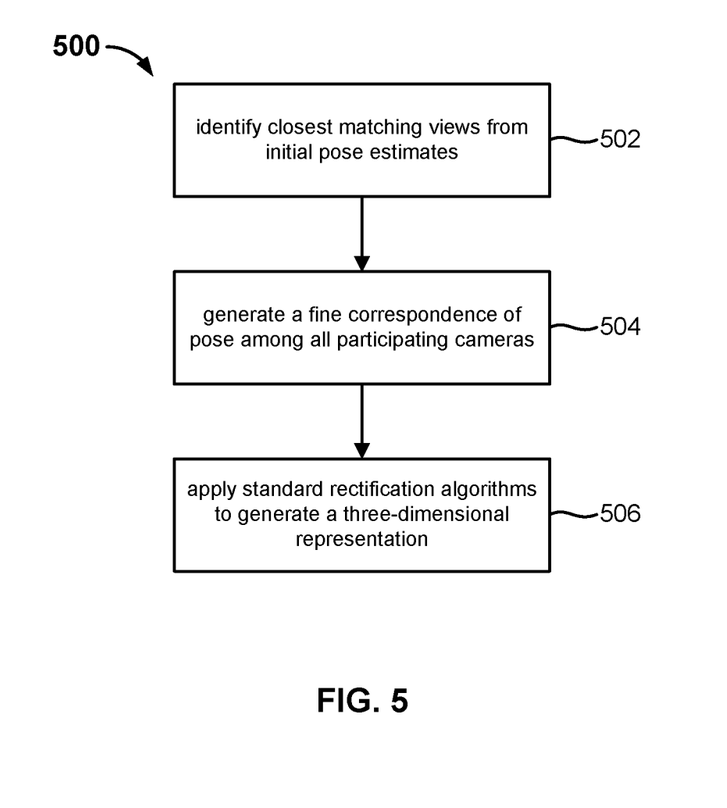
FIG. 5 is a flow chart illustrating an embodiment of a process for facilitating multi-camera fine alignment.

In various embodiments, process 200 may be employed for three-dimensional photography and/or videography. For the latter, the steps of process 200 may be iterated for each of a sequence of time slices, e.g., to generate a three-dimensional video of a scene. Process 200 comprises a general process for three-dimensional reconstruction. FIGS. 3-5 collectively describe three specific successive processes that in some embodiments may be iterated one or more times to improve registration among the cameras. As further described below, the three processes facilitate multi-camera coarse alignment, single camera fine alignment, and multi-camera fine alignment.

FIG. 3 is a flow chart illustrating an embodiment of a process for facilitating multi-camera coarse alignment. Process 300 starts at step 302 at which it is determined that all participating cameras are viewing the same subject, such as prescribed features and/or fiducials of a scene. In some cases, it may be assumed at step 302 that all participants are viewing the same subject. Such an assumption may be made, for instance, in response to an organizer of a recording session initiating a recording event by prompting all participants to view the same subject as the organizer. At step 304, for each camera, a recording of the subject as well as associated sensor data is received. The sensor data may comprise GPS (i.e., latitude/longitude) coordinates as well as angular orientations (i.e., roll, pitch, yaw). At step 306, for each camera, an initial estimate of relative pose with respect to the subject is computed, for example, by assuming that the center of the field of view of each camera is pointing to the same place in space. At step 308, a cost function is created that is based on minimizing the total distance between the vector specifying the line of sight of each camera and the location of the subject. The cost function may be subject to constraints such as preservation of the angular orientations as well as bounding the absolute positions of an associated mobile device within the noise level of the GPS coordinates. In various embodiments, the constraints may be held as ground truth (i.e., strict constraints) or built into the cost function as soft constraints where violations introduce increases to the cost function. At step 310, the cost function is minimized to determine an updated set of coordinates for each camera, which provides an updated estimate of relative pose for each camera with respect to the recorded subject. In various embodiments, the cost function may be formulated as a linear or a non-linear optimization problem with respect to which any appropriate methods may be used to solve for the updated pose.

Once coarse poses are computed using process 300, the position/pose of each camera relative to the subject may be refined by utilizing traditional computer vision algorithms by taking advantage of small changes in perspective introduced by a user while recording a subject. Slight changes in camera position generate slightly different perspectives of the same subject which can be used in combination with known camera parameters to estimate distance and pose relative to the subject. For each camera, small motions should be introduced either deliberately or inadvertently by an associated user so that the same features in different frames of the video sequence appear in different locations or with different relative spacings. For a subject with a feature-rich appearance (i.e., a subject with distinct markings such as edges, corners, complex surface patterns, etc.), many features detected in one frame can be identified in other subsequent frames in the video. Standard methods, including the standard SIFT (scale-invariant feature transform) methods may be applied. FIG. 4 is a flow chart illustrating an embodiment of a process for facilitating single camera fine alignment. In some embodiments, process 400 is iterated for each camera. Process 400 starts at step 402 at which correspondence is established for features between at least two frames within a recorded sequence captured by a prescribed camera. At step 404, the estimate of the relative pose of the camera with respect to the subject is updated. Specifically, once correspondence is established for features between at least two of the frames of a recorded sequence captured by an individual device, the relative pose between the two (or more positions) as well as the relative positions of the features identified in 3D space can be estimated simultaneously. Absolute distances and scale between multiple views are calculated by either estimating the focal lengths using known methods or by foreknowledge of the camera parameters being used to record the sequence.

Given the coarse and fine alignments achieved using processes 300 and 400, the initial estimates for pose and distance for each individual camera can be extended to create correspondence between sets of features seen in common among multiple cameras. FIG. 5 is a flow chart illustrating an embodiment of a process for facilitating multi-camera fine alignment. Process 500 starts at step 502 at which initial pose estimates (e.g., obtained via processes 300 and 400) are employed to identify closest matching views (i.e., nearest neighbor cameras). The SIFT framework may be used to automatically identify devices that are in close proximity or that share similar perspectives. At step 504, a fine correspondence of pose is generated among all participating cameras. In some embodiments, nearest neighbor pairs are automatically connected in sequence. For example, correspondence between camera 1 and its nearest neighbor camera 2 is estimated, subsequently correspondence between camera 2 and its nearest neighbor camera 3 is estimated, and so on until all cameras have relative correspondences. Such an approach may be extended and improved by utilizing multiple nearest neighbor cameras simultaneously (e.g., camera 1 tied together with camera 2 and camera 3, camera 2 tied together with camera 3 and camera 4, etc.). For cases in which a camera cannot be related to another camera through automated correspondence, features which are known to be common between cameras may be manually tagged by a user. For a sequence comprising a large number of image frames, manual tagging may be applied to an intermittent number of frames while automated tracking maintains correspondence between manually tagged frames. At step 506, standard rectification algorithms are applied to generate a three-dimensional representation. That is, once all camera views have correspondence amongst a large number of frames within the recorded sequences, standard rectification methods may be applied between neighboring camera views, e.g., to warp the images so that the epipolar lines are parallel. Step 506 may include computing disparity maps between views or camera pairs and estimating depths of points on images. The resulting depth maps or 3D point clouds, however, may be fairly sparse. Disparity map accuracy may be increased by introducing more than two views or cameras per calculation. Dense correspondence (i.e., a filled in 3D model) may be estimated using standard methods.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive data from a plurality of cameras configured to capture a scene, wherein no foreknowledge exists of relative pose of each camera with respect to the scene and relative poses between cameras;
      for each of the plurality of cameras, determine a relative pose of a given camera with respect to the scene based at least in part on a first estimate and a second estimate, wherein the first estimate of camera pose with respect to the scene is based on image data received from the given camera and the second estimate of camera pose with respect to the scene is based on sensor data received from the given camera and wherein the second estimate is employed to verify and provide a parallel estimate to the first estimate;
      determine relative poses of cameras with respect to one or more other cameras comprising the plurality of cameras based on determined relative poses of individual cameras with respect to the scene; and
      generate a three-dimensional reconstruction of at least a portion of the scene based on the received data and determined relative poses; and
   a memory coupled to the processor and configured to provide instructions to the processor.

2. The system of claim 1, wherein the plurality of cameras is independently operated.

3. The system of claim 1, wherein relative time variant poses of the cameras with respect to the scene and with respect to each other are not fixed and known a priori.

4. The system of claim 1, wherein determined relative camera pose with respect to the scene is based on a common set of identified points in the scene.

5. The system of claim 1, wherein the second estimate is employed to fill gaps in pose estimation when pose cannot be determined from the first estimate.

6. The system of claim 1, wherein data is received and relative poses are determined for each of a plurality of times slices.

7. The system of claim 1, wherein the three-dimensional reconstruction of at least the portion of the scene comprises a static or a motion-based three-dimensional reconstruction.

8. The system of claim 1, wherein received data comprises image data and sensor data.

9. The system of claim 1, wherein received data is time stamped.

10. The system of claim 1, wherein sensor data comprises Global Positioning System (GPS) coordinates.

11. The system of claim 1, wherein sensor data comprises latitude and longitude coordinates and angular orientations.

12. The system of claim 1, wherein sensor data comprises three translational coordinates and three rotational angles comprising a combined six degrees of freedom.

13. The system of claim 1, wherein to generate the three-dimensional reconstruction comprises to minimize a cost function subject to one or more constraints.

14. The system of claim 1, wherein to generate the three-dimensional reconstruction comprises to establish correspondence of features between frames of a video sequence.

15. The system of claim 1, wherein to generate the three-dimensional reconstruction comprises to identify closest matching views from nearest neighbor cameras.

16. The system of claim 1, wherein data is received from a client-side application and the three-dimensional reconstruction is generated by a server-side application.

17. A method, comprising:
receiving data from a plurality of cameras configured to capture a scene, wherein no foreknowledge exists of relative pose of each camera with respect to the scene and relative poses between cameras:
for each of the plurality of cameras, determining a relative pose of a given camera with respect to the scene based at least in part on a first estimate and a second estimate, wherein the first estimate of camera pose with respect to the scene is based on image data received from the given camera and the second estimate of camera pose with respect to the scene is based on sensor data received from the given camera and wherein the second estimate is employed to verify and provide a parallel estimate to the first estimate:
determining relative poses of cameras with respect to one or more other cameras comprising the plurality of cameras based on determined relative poses of individual cameras with respect to the scene:
and generating a three-dimensional reconstruction of at least a portion of the scene based on the received data and determined relative poses.

18. A computer program product embodied in a non-transitory computer readable storage medium and comprising computer instructions for:
receiving data from a plurality of cameras configured to capture a scene, wherein no foreknowledge exists of relative pose of each camera with respect to the scene and relative poses between cameras:
for each of the plurality of cameras, determining a relative pose of a given camera with respect to the scene based at least in part on a first estimate and a second estimate, wherein the first estimate of camera pose with respect to the scene is based on image data received from the given camera and the second estimate of camera pose with respect to the scene is based on sensor data received from the given camera and wherein the second estimate is employed to verify and provide a parallel estimate to the first estimate:
determining relative poses of cameras with respect to one or more other cameras comprising the plurality of cameras based on determined relative poses of individual cameras is with respect to the scene:
and generating a three-dimensional reconstruction of at least a portion of the scene based on the received data and determined relative poses.

19. The method of claim 17, wherein the plurality of cameras is independently operated.

20. The method of claim 17, wherein relative time variant poses of the cameras with respect to the scene and with respect to each other are not fixed and known a priori.

21. The method of claim 17, wherein determined relative camera pose with respect to the scene is based on a common set of identified points in the scene.

22. The method of claim 17, wherein the second estimate is employed to fill gaps in pose estimation when pose cannot be determined from the first estimate.

23. The method of claim 17, wherein data is received and relative poses are determined for each of a plurality of times slices.

24. The method of claim 17, wherein the three-dimensional reconstruction of at least the portion of the scene comprises a static or a motion-based three-dimensional reconstruction.

25. The method of claim 17, wherein received data comprises image data and sensor data.

26. The method of claim 17, wherein received data is time stamped.

27. The method of claim 17, wherein sensor data comprises Global Positioning System (GPS) coordinates.

28. The method of claim 17, wherein sensor data comprises latitude and longitude coordinates and angular orientations.

29. The method of claim 17, wherein sensor data comprises three translational coordinates and three rotational angles comprising a combined six degrees of freedom.

30. The method of claim 17, wherein generating the three-dimensional reconstruction comprises minimizing a cost function subject to one or more constraints.

31. The method of claim 17, wherein generating the three-dimensional reconstruction comprises establishing correspondence of features between frames of a video sequence.

32. The method of claim 17, wherein generating the three-dimensional reconstruction comprises identifying closest matching views from nearest neighbor cameras.

33. The method of claim 17, wherein data is received from a client-side application and the three-dimensional reconstruction is generated by a server-side application.

34. The computer program product of claim 18, wherein the plurality of cameras is independently operated.

35. The computer program product of claim 18, wherein relative time variant poses of the cameras with respect to the scene and with respect to each other are not fixed and known a priori.

36. The computer program product of claim 18, wherein determined relative camera pose with respect to the scene is based on a common set of identified points in the scene.

37. The computer program product of claim 18, wherein the second estimate is employed to fill gaps in pose estimation when pose cannot be determined from the first estimate.

38. The computer program product of claim 18, wherein data is received and relative poses are determined for each of a plurality of times slices.

39. The computer program product of claim 18, wherein the three-dimensional reconstruction of at least the portion of the scene comprises a static or a motion-based three-dimensional reconstruction.

40. The computer program product of claim 18, wherein received data comprises image data and sensor data.

41. The computer program product of claim 18, wherein received data is time stamped.

42. The computer program product of claim 18, wherein sensor data comprises Global Positioning System (GPS) coordinates.

43. The computer program product of claim 18, wherein sensor data comprises latitude and longitude coordinates and angular orientations.

44. The computer program product of claim 18, wherein sensor data comprises three translational coordinates and three rotational angles comprising a combined six degrees of freedom.

45. The computer program product of claim 18, wherein generating the three-dimensional reconstruction comprises minimizing a cost function subject to one or more constraints.

46. The computer program product of claim 18, wherein generating the three-dimensional reconstruction comprises establishing correspondence of features between frames of a video sequence.

47. The computer program product of claim 18, wherein generating the three-dimensional reconstruction comprises identifying closest matching views from nearest neighbor cameras.

48. The computer program product of claim 18, wherein data is received from a client-side application and the three-dimensional reconstruction is generated by a server-side application.

* * * * *

UNITED STATES PATENT AND TRADEMARK OFFICE
CERTIFICATE OF CORRECTION

PATENT NO. : 11,212,510 B1
APPLICATION NO. : 16/996735
DATED : December 28, 2021
INVENTOR(S) : Clarence Chui It is certified that error appears in the above-identified patent and that said Letters Patent is hereby corrected as shown below:

In the Claims

In Column 7, Line(s) 29, Claim 17, after "cameras", delete ":" and insert --;--, therefor.

In Column 7, Line(s) 39, Claim 17, after "estimate", delete ":" and insert --;--, therefor.

In Column 7, Line(s) 43, Claim 17, after "scene", delete ":" and insert --;--, therefor.

In Column 7, Line(s) 53, Claim 18, after "cameras", delete ":" and insert --;--, therefor.

In Column 7, Line(s) 63, Claim 18, after "estimate", delete ":" and insert --;--, therefor.

In Column 7, Line(e) 67, Claim 18, after "scene", delete ":" and insert --;--, therefor.

Signed and Sealed this
Seventh Day of March, 2023

Katherine Kelly Vidal
*Director of the United States Patent and Trademark Office*